United States Patent [19]

Choi et al.

[11] Patent Number: 5,660,616
[45] Date of Patent: Aug. 26, 1997

[54] METHOD AND DEVICE WITH A GAS LAYERED SIEVE PLATE FOR WET DESULFURIZATION FROM FLUE GAS

[75] Inventors: Byung-Sun Choi; Joo-Soo Kim; So-Min Park; Jin-Pyo Hong; Seung-Soo Park; Kwon-Soon Park; Dong-Wha Kim; Chang-Mo Nam, all of Daejeon; Yung-Hwan Kim, Chungchungbuk-do, all of Rep. of Korea

[73] Assignee: Korea Electric Power Corp., Seoul, Rep. of Korea

[21] Appl. No.: 434,203

[22] Filed: May 3, 1995

[30] Foreign Application Priority Data

May 6, 1994 [KR] Rep. of Korea ............ 94-9930
Dec. 26, 1994 [KR] Rep. of Korea ........... 94-36804

[51] Int. Cl.⁶ ............................. B01D 47/00; B01D 47/02
[52] U.S. Cl. .......................... 95/213; 95/226; 55/256; 261/113; 261/114.3; 422/172; 422/220; 422/231; 423/242.1; 423/243.09; 423/244.01
[58] Field of Search ................ 95/213, 226; 55/256; 261/113, 114.3; 422/172, 220, 231; 423/243.09, 242, 244

[56] References Cited

U.S. PATENT DOCUMENTS

| | | | |
|---|---|---|---|
| 3,892,837 | 7/1975 | Uchiyama et al. | 423/242 |
| 4,099,925 | 7/1978 | Yanagioka et al. | 422/170 |
| 4,432,954 | 2/1984 | Quante | 423/171 |
| 4,956,127 | 9/1990 | Binkley et al. | 261/114.3 |
| 4,975,257 | 12/1990 | Lin | 423/244 |
| 5,246,471 | 9/1993 | Bhat et al. | 55/223 |

OTHER PUBLICATIONS

Perry's Chemical Engineering Handbook, Fifth Edition, Copyright 1973, 1963; pp. 5-16—5-17.

*Primary Examiner*—Nina Bhat
*Attorney, Agent, or Firm*—Michael D. Bednarek; Kilpatrick Stockton LLP

[57] ABSTRACT

A method and a device for wet desulfurization of flue gas to remove a sulfur dioxide($SO_2$) contained in flue gas discharged from thermal power stations and boilers are disclosed. In the method the device with a gas layered sieve plate for wet desulfurization of flue gas, an absorbing liquid improves reacting conditions by effecting it own circulation without using additional power due to the structural characteristics possessed by the device and flue gas is treated very satisfactorily thanks to high gas-liquid contact efficiency. In order to minimize power consumption and the size of the device but promote desulfurization to an unusual degree, an absorber is divided into an upper froth layer and a lower liquid layer by a single-stage gas dispersing plate with a large number of gas ejection holes bored therein. The absorber comprises a liquid downcomer which enables absorbing liquid which absorbed a sulfur dioxide from the froth layer to overflow when it rises higher than a proper height and then fall by a difference in liquid head produced between the froth layer and the liquid downcomer and a liquid riser which extends downward to a proper length from the gas dispersing plate and enables the absorbing liquid to rise above the gas dispersing plate for ejection to the extent of its fall, and so the absorbing liquid effects its own circulation at a high speed without using additional power. To raise adaptability to changes in boiler load, a number of V notches are formed at regular intervals at the upper end of an overflow weir.

4 Claims, 4 Drawing Sheets

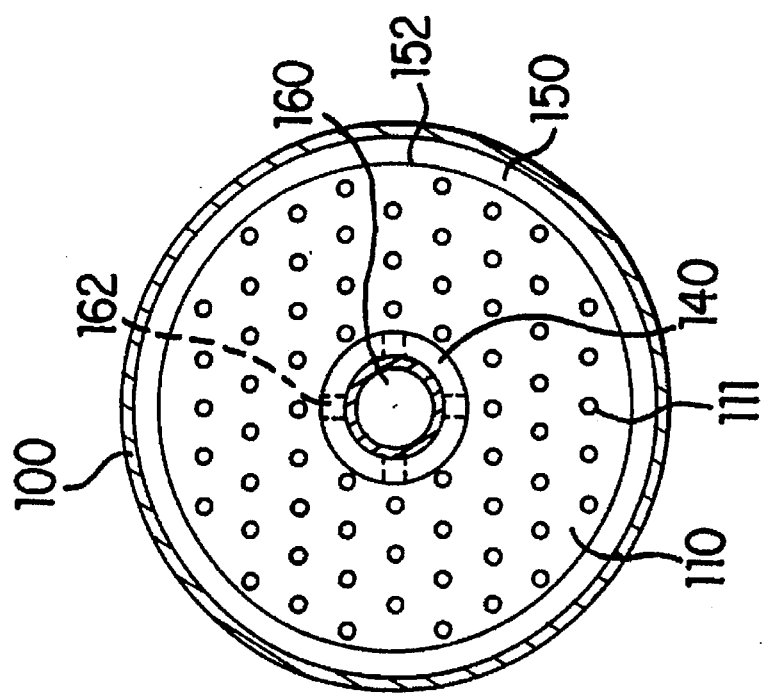
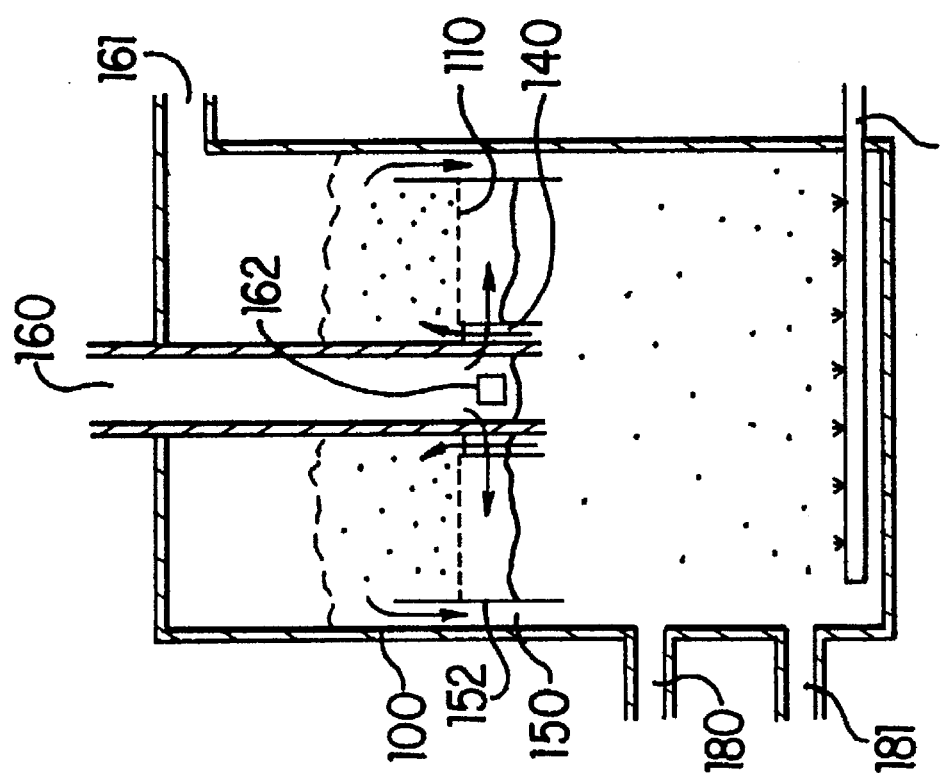

METHOD AND DEVICE WITH A GAS LAYERED SIEVE PLATE FOR WET DESULFURIZATION FROM FLUE GAS

FIELD OF THE INVENTION

The present invention relates to a method and a device for wet desulfurization from to remove a sulfur dioxide contained in flue gas from thermal power stations and industrial boilers. More particularly, the invention relates to a method and a device with a gas layered sieve plate for wet desulfurization from flue gas, which improves reacting conditions by effecting its own circulation without using additional power for circulation of absorbing liquid according to its structural characteristics and operates satisfactorily for treatment of flue gas by promoting gas-liquid contact efficiency within the device.

BACKGROUND OF THE INVENTION

Generally, there are two types of flue gas desulfurization system. One is a liquid dispersion type which sprays absorbent-containing liquid to flue gas and the other is a gas dispersion type which ejects flue gas directly to absorbing liquid.

Among the flue gas desulfurization system now in commercial use, there is a spray tower and there are a tray tower and a jet bubbling reactor.

What are required of these devices are high $SO_2$ removal efficiency, low energy consumption for operation and adaptability to a change in operating conditions of a boiler without a drop in treatment efficiency.

In the case where the tray tower is used as an absorber of Sox contained in flue gas, absorbing liquid, which is usually a slurry of calcium compound, is supplied from the upper part of the tower and $So_x$-containing flue gas is made to go through multi-stage gas-liquid contact dispersion plates by blowing it from the middle or lower part.

As in the above absorber, multi-stage gas dispersing plates must be installed in the method where countercurrent form of gas-liquid contact is made in order to remove $SO_2$.

However, such a gas dispersing plate involves a problem by reason that it comes into play as a resisting factor through several stages, thereby causing the absorber to suffer greatly from loss of pressure, and it consumes a considerable amount of power for pumping of absorbing liquid which must be transported to the upper part of the tower.

It also involves a problem for the reason that a L/G ratio (the ratio of absorbing liquid to the amount of gas) must be made high to promote desulfurization efficiency, and pumping for supplying a large amount of absorbing liquid consumes a considerable amount of power and the size of the absorber becomes large in order to obtain the effective gas-liquid contact area and scale is formed therein.

In a spray tower too, exhaust gas is blown in from the upper or lower part and absorbent-containing liquid is sprayed through numerous nozzles from the upper part.

Such a spraying method is smaller in loss of pressure than the tray tower method.

However, it also involves a problem by reason that absorbing liquid must be transported to the upper part and sprayed under high pressure through nozzles, requiring the pump to consume a large amount of power.

The desulfurization system from flue gas (U.S. Pat. No. 4,099,925) obtains a driving force required for circulation of reacting absorbing liquid from injection of air for oxidation through a liquid rising pipe.

Therefore, in order to keep constant the height of a froth layer on the dispersing plate when the amount of introduced flue gas changes, the amount of air injection for oxidation must be changed.

Moreover, an overflow weir is fixed to given height, and so when the height of the froth layer on the dispersing plate become low with the amount of introduced flue gas becoming small according to a change in operating conditions of the boiler, absorbing liquid is considerably reduced in the mount and force of its circulation or fails to overflow the overflow weir. Thus, the mount and force of circulation of absorbing liquid are reduced and the efficiency of the absorber is thereby lowered.

In the gas-liquid contact reaction device (U.S. Pat. No. 4,239,515) too, adaptability is reduced according to fluctuations in boiler load because the height of an overflow weir is fixed. When scale is up, one liquid falling pipe is required for every gas introducing pipe, and so a ratio to which the liquid falling pipe amounts per unit area of the reaction device becomes high. Accordingly, the diameter of the device becomes large.

In order for a gas dispersion method to be highly efficient in the gas-liquid contact device, the device must be so made as to keep its efficiency constant even when the amount and pressure of introduced gas make a change according to a change in boiler operating conditions and, in order to reduce power consumption, unnecessary power loss must be minimized.

SUMMARY OF THE INVENTION

The present invention contrived to solve those problems is to provide a method and a device with gas layered sieve plate for wet desulfurization from flue gas, which minimize power consumption and the scale of the device but excel in adaptability to changes in boiler load and perform desulfurizing functions excellently.

In order to attain the above object, the invented device is characterized in that it is divided into froth layer on the gas dispersing plate and a liquid layer under thereof by the single-stage gas dispersing plate with a number of gas holes bored in it and absorbing liquid which absorbed a sulfur dioxide as flue gas was introduced is set up to a proper height by forming a froth layer higher than a given height and that it is provided with a liquid downcomer which enables the absorbing liquid to fall crossing an overflow weir with a number of V notches hollowed out at its upper end and a liquid riser which enables the absorbing liquid to rise to the upside of the gas dispersing plate from the liquid layer for ejection to the extent of its fall by being installed to a proper length underneath the gas dispersing plate.

In particular, a gas layer is formed by the pressure of introduced gas underneath the single-stage gas dispersing plate, and the froth layer consisting of fine bubbles is formed on the gas dispersing plate as gas is ejected at a high speed through the gas dispersing plate with gas holes bored uniformly.

When the absorbing liquid on the gas dispersing plate which has high potential energy according as the froth layer is formed overflows to the liquid downcomer crossing the overflow weir installed to a proper height and provided with a number of V notches, a difference in water head is made between the liquid downcomer and froth layer and this difference comes into play as driving force which enables the absorbing liquid between the froth layer and liquid layer to circulate consecutively, and therefore the absorbing liquid between the froth layer on the gas dispersing plate and liquid layer underneath the gas dispersing plate is enabled to circulate at a high speed through the liquid risers and downcomers.

Even in the case where the gas layer is not formed completely due to a decline in the mount of introduced gas caused by decreases in boiler load, the gas hole from which no gas is ejected comes into the same play as the liquid riser on the gas dispersing plate and smooth circulation of absorbing liquid is thereby achieved. Thus, the efficiency of $SO_2$ removal is not lowered.

Moreover, a large number of V notches are formed in regular shapes and at regular interval in the overflow weir so that circulation of liquid in the upper and lower sides of the gas dispersing plate may properly correspond to a change in the amount of introduced gas.

The V notches have the advantage of placing no barrier when the absorbing liquid crosses the overflow weir even if the height of the froth layer is lowered by a change in operating conditions and minimizing power consumption by enabling the absorbing liquid to circulate under optimum conditions at all times.

Moreover, by injecting oxidation air into the liquid layer, the absorbing liquid in the liquid layer which contains a sufficient amount of dissolved oxygen and limestone slurry rises quickly to the froth layer where $SO_2$, absorbed through the liquid riser by quick circulation between the froth layer and liquid layer and oxidizes $SO_2$ absorbed into the froth layer directly to $H_2SO_4$ and produces gypsum by reaction with $H_2SO_4$ and limestone simultaneously.

Since such a reaction is effected quickly and consecutively and $H_2SO_4$ has a negligible $SO_2$ partial pressure in the absorbing liquid is kept as low as possible and the high efficiency of removal is thereby obtained even under low pH.

BRIEF DESCRIPTION OF THE DRAWINGS

Now, embodiments of the present invention will be described in detail by referring to the drawings attached hereto.

(A) shows that it is suspended, (B) shows that it is operated, (C) is a sectional view taken along the A—A line of (A).

FIG. 4 is a sectional view of further another embodiment of the present invention.

DETAILED DESCRIPTION OF THE INVENTION

Figure 1:
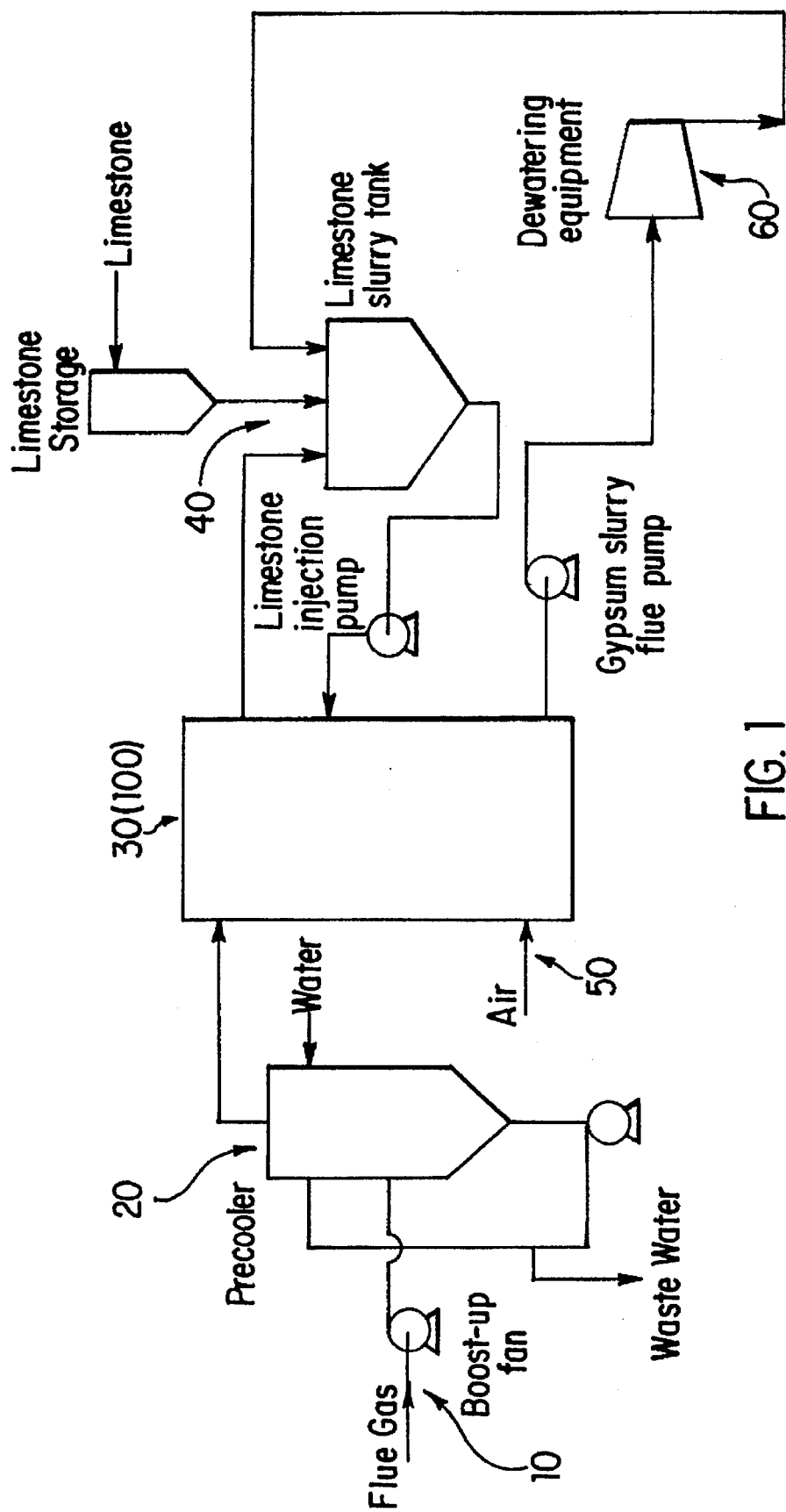
FIG. 1 is a schematic diagram showing the process of treating flue gas.

FIG. 1 is a schematic diagram showing the usual process of treating flue gas.

It comprises a boost-up fan 10 which pressurizes flue gas for supply, a precooler 20 which removes dust and impurities like HCl and HF contained in the supplied flue gas, and absorber 30 which absorbs a sulfur dioxide contained in flue gas and produces a gypsum crystal by reaction with supplied limestone slurry, a limestone slurry supply part 40 which supplies the limestone slurry so that reaction in the absorber 30 may be effected consecutively and smoothly, an oxidation air supply part 50 and a dewatering system 60 which dewaters the gypsum crystal produced in an absorber 100.

In the present invention, the absorber 100, a major unit in the above flue gas treating device, is improved afresh.

Figure 2:
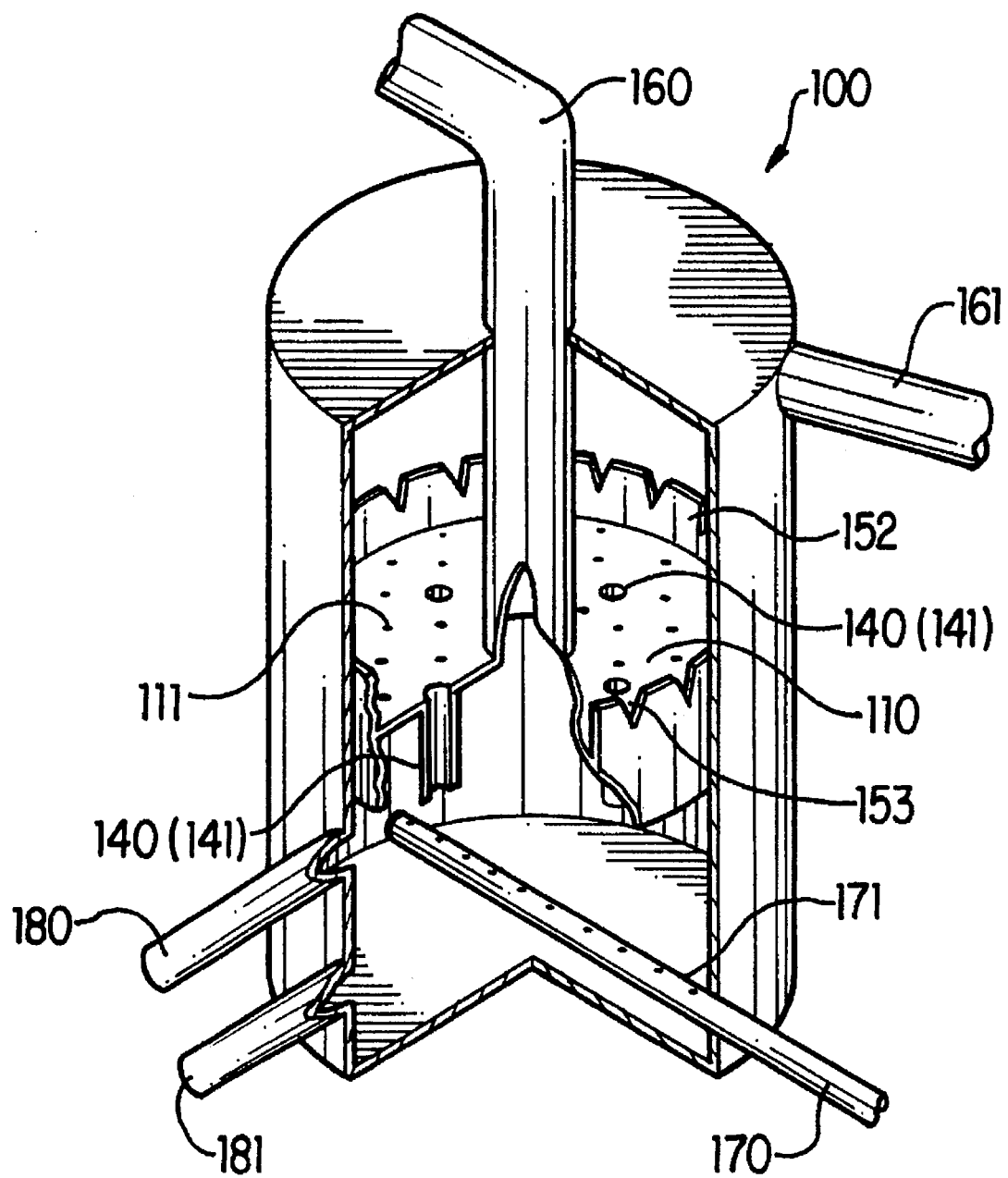
FIG. 2 is a partially cut-open perspective view of one embodiment of the present invention.

FIG. 2 is a partially cut-open perspective view of one embodiment of the present invention. It shows major parts of the absorber 100.

In this absorber 100, a gas dispersing plate 110 with a number of gas holes 111 bored therein, a flue gas introducing pipe 160 which introduces flue gas to the gas dispersing plate 11 from the outside and an absorbing liquid overflow weir 152 with a proper height from the edge of the gas dispersing plate 110 are formed in on united body in the internal middle-upper part thereof and absorbing liquid risers 141 are installed at regular intervals for ejection of absorbing liquid underneath the gas dispersing plate so as to communicate with the surface thereof.

To make the absorbing liquid smoothly adjustable even when the height of the froth layer changes, a number of V notches are formed at regular intervals at the upper end of the absorbing liquid overflow weir 152.

The absorbing liquid overflow weir 152 is installed extending long to under the gas dispersing plate 110. By extending the end of absorbing liquid overflow weir 152 lower than the absorbing liquid overflow weir 152 lower than the absorbing liquid risers 141, absorbing liquid is made to circulate uniformly and smoothly.

A gas outlet duct 161 which discharges treated gas is connected to one side at the upper end thereof. An oxidation air injection pipe 170 and nozzles 171 for supply of $O_2$ so as to enable absorbed $SO_2$ to be oxidized into $H_2O_4$ are installed at the lower end thereof. Moreover, a gypsum draw-off pipe 181 which discharges gypsum produced in the absorber 100 and a slurry supply pipe 180 which supplies limestone slurry anew to cover those limestones which are consumed in the process of reaction are installed.

The working effect of one embodiment of the present invention constituted in such a manner as described above will be described according to FIG. 3.

Figure 3C:
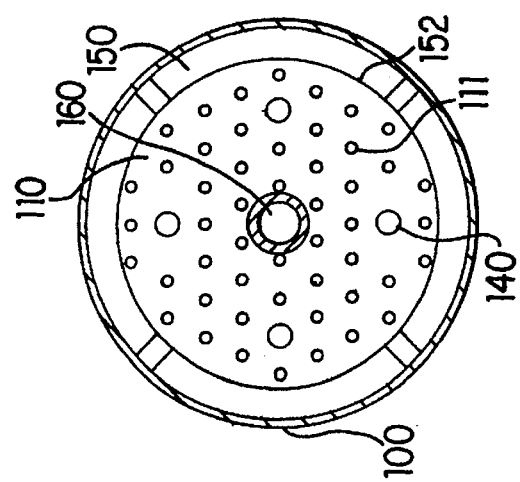
FIG. 3 is a sectional view showing that one embodiment of the present invention is in operation.
Figure 3B:
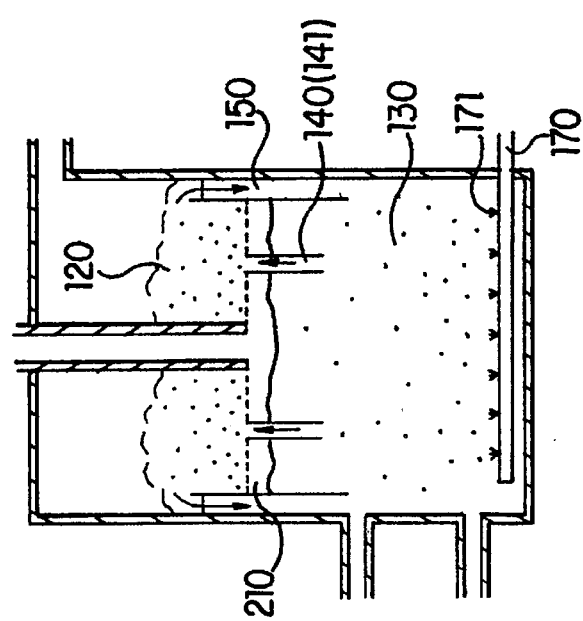
Figure 3A:
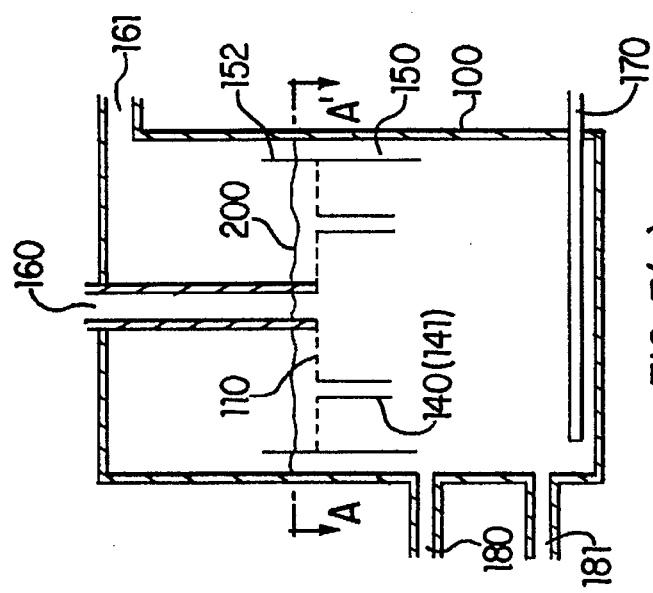

In FIG. 3, (A) is a sectional view showing that operation is suspended. It illustrates that the gas dispersing plate 110 is immerged absorbing liquid.

When flue gas is introduced to under the gas dispersing plate 110 through the flue gas introducing pipe 160 in such a condition, a gas layer 210 is formed under the gas dispersing plate 110 as illustrated in FIG. 3(B) and high-speed gas is injected through the gas hole 111.

In the froth layer 120 formed by gas ejection, flue gas makes contact with absorbing liquid and a sulfur dioxide contained in the flue gas is thereby absorbed into the absorbing liquid and the absorbing liquid on the gas dispersing plate 110 which rises in potential energy due to the formation of the froth layer 120 crosses the overflow weir 152 while rising with a large number of froths formed and falls to the liquid layer 130 under the gas dispersing plate 110.

In other words, when liquid head within the liquid downcomer 150 is higher than that of the whole froth layer 120, new absorbing liquid 200 rises through the liquid riser 141 as much as an amount which crossed the overflow weir 152 by the difference between the two. At this time, those V notches formed at the upper end of the overflow weir 152 properly deal with circulation of absorbing liquid according to operating conditions.

While the above operations are conducted, the sulfur dioxide contained in flue gas is absorbed largely into absorbing liquid in the froth layer and effects the following chemical reactions on the whole by reaction with dissolved oxygen and limestone slurry which are supplied from the liquid layer 130.

If the chemical reactions are expressed by a reaction formula, reaction of $CaCO_3+SO_2+2H_2O+1/SO_2 \rightarrow CaSO_4 \cdot 2H_2O+CO_2$ is effected and a gypsum crystal is thereby formed.

Gypsum produced as a by-product in the process of said reaction is a useful material for various uses.

FIG. 4 is further another embodiment of the present invention.

The absorbing liquid downcomer 150 is installed around the gas dispersing plate 110 and the absorbing liquid riser 140 is installed around a gas introducing pipe 160 in the center. A number of flue gas inducing paths 162 are installed in the side wall of the absorbing liquid riser 140.

The above device has the advantage of raising absorptivity by forming the circulation routes of absorbing liquid in a radial manner.

All embodiments of the present invention will now be described in great detail.

When flue gas containing $So_x$ is introduced through more than one flue gas introducing pipe 160 into the absorbing tank 100 maintained to a given height of liquid on the gas dispersing plate 110, a gas layer is formed instantaneously at the lower end of the gas dispersing plate 110 with a large number of gas holes 111 bored therein and gas is injected onto the gas dispersing plate 110 through the gas holes 111.

At this time, fine bubbles are formed in the froth layer 120 on the gas dispersing plate 110. An experiment proves that in order to maximize a gas-liquid contact effect per unit area of an absorber, the size and the number of gas holes 111 and gas velocity at those holes should be adjusted so that Reynolds number at the gas ejection holes 111 may amount to more than 5,000 and less than 50,000.

The absorbing liquid in the froth layer 120 on the gas dispersing plate 110 defoames as soon as it flows over the overflow weir 152 and it circulates to the liquid layer 130 below at a high speed through the liquid downcomer 151 by a difference in liquid head between the bubble layer and absorbing liquid downcomer 150.

At the same time, fresh absorbing liquid as much as quantity which crossed the absorbing liquid downcomer 152 rises to the froth layer on the gas dispersing plate 110 through the absorbing liquid riser 140 from the liquid layer 130 in order to keep pressure in the gas layer on a balanced level. While bubbles are formed consecutively by the gas ejected through the gas holes 111, gas-liquid contact is made and the absorbing liquid circulates consecutively at a high speed.

Accordingly, the absorbing liquid which absorbed $SO_2$ gas from the froth layer 120 comes down to the liquid layer 130 below at a high speed and fresh absorbing liquid which recovered $SO_2$ absorbing capacity, is supplied to the bubble layer on the gas dispersing plate 110, and so consecutive absorption of $SO_2$ is thereby made possible.

The absorbing liquid in the froth layer 120 and liquid layer 130 makes it possible to circulate consecutively at a high speed without an additional circulation pump, and so it is not necessary to use a pump for the circulation of absorbing liquid.

The L/G ratio in the present device being so large as to mount to 40–60 $1/Nm^3$, it is possible to minimize the device. The velocity of circulation of absorbing liquid in the froth layer and liquid layer being high, a difference in pH of absorbing liquid in the froth layer and liquid layer is very small, and therefore utilization of an absorbent increases.

In order to make rate of oxidation reaction high, it is desirable to keep the pH of absorbing liquid as low as possible. In this viewpoint, $SO_2$ absorbed into the absorbing liquid is oxidized to $H_2SO_4$ by injecting oxidation air from the lower part of the device and pH of absorbing liquid is thereby kept low and partial pressure of $SO_2$ in the absorbing liquid is also kept as low as possible. Thus, efficiency of desulfurization mounting to higher than 90% even under low pH like pH 3 is attainable.

According to embodiments of the present invention, the efficiency of $SO_2$ removal was kept almost constant at pH mounting to more than 3.8 in the present device.

Therefore, gas-liquid contact efficiency per unit area of the device is not only high by the use of single-stage gas dispersing plate with a large number of gas holes bored but also the L/G ratio is very large even without a circulation pump and the device can be thereby minimized.

Moreover, internal contrivances including the gas dispersing plate can make use of cheap materials like PVC.

What are important in constituting the internal structures of the device are the size of the gas hole, the whole area of the gas hole, the effective area of the gas dispersing plate, the whole sectional area of the liquid risers, the whole sectional area of the liquid downcomers and the sectional area of the absorbers.

It was ascertained that in order to prevent absorbing liquid from weeping into the gas hole and keep the stability of the bubble layer and efficient gas-liquid contact, the device must be constituted under the following conditions:

Superfacial velocity of gas at the gas hole 5–40 m/s
Diameter of the gas hole 5–30 mm

| Ao/Aa | 0.05–0.3 |
| Aa/At | 0.5–0.8 |
| Ar/Aa | 0.05–0.2 |
| Ad/At | 0.05–0.2 | wherein,

Ao is the whole area of the gas hole,

Aa is the effective area of the gas dispersing plate, namely, the area of the gas dispersing plate excluding the whole area of the gas introducing pipe and the area taken by the liquid riser, Ar is the whole sectional area of the liquid risers, Ad is the sectional area of the liquid downcomer, At is the sectional area of the absorber.

As the experimental results, the following results were obtained from an experiment conducted in desulfurizing flue gas pre-treated in a precooler using a single-stage sieve plate-type wet flue gas desulfurizing device as shown in FIG. 3.

The device used for said experiment is a wet flue gas desulfurizing device which is 60 cm in diameter and 300 cm in height,

| wherein Ao/Aa = 0.1 | Aa/At = 0.7 |
| Ar/Aa = 0.1 | Ad/At = 0.1 |

The efficiency of desulfurization amounting to more than 95% was attained by supplying flue gas in which the concentration of SO2 was 1,000 ppm in gas flow rate of 1,500 Nm³ per hour and by consecutively supplying slurry like limestones and oxidation air in flow rate amounting to 10 Nm3 per hour so that pH of absorbing liquid might maintain 3-4 and it was ascertained that the efficiency of desulfurization was kept at almost constant value under the condition that pH of reacting liquid amounted to more than about 3.8 in the froth layer.

As the result of an experiment conducted by changing the amount of introduced gas to 1,500 Nm³/hr, 1,150 Nm³/hr and 750 Nm³/hr to ascertain adaptability according to changes in load, gas pressure loss amounting to 250 mmAq, 230 mmAq and 210 mmAq respectively was incurred to attain 95% desulfurization efficiency. It was a gas pressure loss naturally reduced by a decrease in the amount of introduced gas under the condition that a liquid level above the above froth layer was not adjusted artificially.

Moreover, purity of gypsum produced as a by-product amounted to more than 97% on an average and limestone utilization showed more than 99%.

As described heretofore, the advantage of treating flue gas with an flue gas desulfurization method and device according to the present invention maintains a condition where responsiveness is very good for the reason that additional power for circulation of absorbing liquid is not require at all, so that power loss is smaller than the process heretofore followed and energy efficiency is very satisfactory and that the froth layer above the sieve plate supplies the absorbing liquid in which absorption of sulfur dioxide is completed and the liquid layer below supplies a sufficient amount of dissolved oxygen($O_2$) and alkali($CaCO_3$).

In other words, due to the introduction of overflow weir with a number of V notches hollowed out, adaptability to a change in operating conditions is very excellent, absorptivity of sulfur dioxide is maximized by the perfect circulation of absorbing liquid, and scale is not formed in the device due to a sufficient oxidation condition produced by the overall circulation of absorbing liquid.

Furthermore, if the device is manufactured to a size amounting to 70%-80% of the existing device, it will display the same or higher absorptivity. In particular, the number of gas holes per unit area of absorber can be increased. Since the diameter of a gas introducing pipe and the velocity of introduced gas can be increased, the size of the device can be minimized accordingly.

What is claimed is:

1. A method for wet desulfurization of a flue gas, comprising the steps of:
    a) providing an absorber that is divided into an upper froth layer and a lower liquid layer using a single-stage gas dispersing plate with a number of gas holes bored therein;
    b) forming a gas layer underneath said gas dispersing plate by introduced gas pressure, which forces an absorbing liquid to rise to said froth layer through an absorbing liquid riser;
    c) ejecting gas containing sulfur dioxide gas through said gas holes on the gas dispersing plate to said absorbing liquid to form said froth layer, which causes said absorbing liquid in said froth layer to overflow an overflow weir having a number of V notches hollowed out to a proper height;
    d) using a difference in a water head formed between said froth layer and an absorbing liquid downcomer to circulate said absorbing liquid in said froth layer without requiring additional pumping; and
    e) accounting for changing operating conditions by providing V notches in the overflow weir, thereby effecting a satisfactory continuous absorbing reaction for absorption of sulfur dioxide contained in flue gas.

2. The method according to claim 1, wherein said step b) of forming further comprises using a gas dispersing plate formed as to enable a Reynolds number to amount to more than 5,000 and less than 50,000 depending on an amount of treated gas by adjusting a diameter and a number of gas holes bored in said gas dispersing plate.

3. The method according to claim 1, wherein the step b) of forming further comprises using a gas dispersing plate having:
    (i) a ratio of a total area of all of said holes to an effective area of said gas dispersing plate is 0.05-0.3;
    (ii) a ratio of the effective area of said gas dispersing plate to a sectional area of the device at large is 0.5-0.8;
    (iii) a ratio of a sum of sectional areas of the absorbing liquid riser at large to the effective area of said gas dispersing plate is 0.05-0.2; and
    (iv) a ratio of a sum of sectional areas of the absorbing liquid downcomer at large to the effective area of said gas dispersing plate is 0.05-0.2; and
    (v) a ratio of a sum of sectional areas of a flue gas introducing pipe to the device at large is 0.05-0.12.

4. A device for wet desulfurization of the flue gas comprising:
    an absorber including gas dispersing plate having a plurality of gas holes, said gas dispersing plate forming an upper froth layer and a lower liquid layer;
    an absorbing liquid riser which enables said absorbing liquid to rise and circulate, said riser having an upper end reaching a surface of said gas dispersing plate and having a lower end extending so as to soak in said absorbing liquid of said liquid layer at all times;
    an absorbing liquid downcomer which enables said absorbing liquid on said gas dispersing plate to overflow, said downcomer having an upper end forming a froth layer to a predetermined height above the surface of said gas dispersing plate and having a lower end extending so as to soak in said absorbing liquid of said liquid layer wherein said absorbing liquid downcomer is disposed around said gas dispersing plate and said absorbing liquid riser is disposed around a flue gas introducing pipe in a center of the plate but a number of flue gas introducing paths are formed in a side wall of said absorbing liquid riser; and
    an overflow weir for overflow of absorbing liquid having a predetermined height around said gas dispersing plate and having a number of V notches formed at an upper end of said overflow weir and the absorbing liquid is thereby made to overflow smoothly in spite of a change in a height of the gas layer.

* * * * *